United States Patent
Zhang et al.

(10) Patent No.: US 11,612,169 B2
(45) Date of Patent: Mar. 28, 2023

(54) PREPARATION METHOD FOR WATER-RETAINING NANOAGENT AND PROCESS OF TREATMENT CRUSTACEAN PRODUCT BY WATER-RETAINING NANOAGENT PREPARED BY THEREOF

(71) Applicants: JIANGNAN UNIVERSITY, Jiangsu (CN); YANGZHOU YECHUN FOOD PRODUCTION AND DISTRIBUTION INCORPORATED COMPANY, Jiangsu (CN)

(72) Inventors: Min Zhang, Jiangsu (CN); Yanan Sun, Jiangsu (CN); Baosong Bai, Jiangsu (CN); Haixiang Wang, Jiangsu (CN); Xianglian Wang, Jiangsu (CN)

(73) Assignees: JIANGNAN UNIVERSITY, Jiangsu (CN); YANGZHOU YECHUN FOOD PRODUCTION AND DISTRIBUTION INCORPORATED COMPANY, Jiangsu (CN)

(*) Notice: Subject to any disclaimer, the term of this patent is extended or adjusted under 35 U.S.C. 154(b) by 0 days.

(21) Appl. No.: 17/425,948

(22) PCT Filed: Dec. 6, 2019

(86) PCT No.: PCT/CN2019/123533
§ 371 (c)(1),
(2) Date: Jul. 27, 2021

(87) PCT Pub. No.: WO2021/088178
PCT Pub. Date: May 14, 2021

(65) Prior Publication Data
US 2022/0151250 A1    May 19, 2022

(30) Foreign Application Priority Data
Nov. 6, 2019    (CN) .......................... 201911075891.6

(51) Int. Cl.
A23B 4/20      (2006.01)
A23L 17/40     (2016.01)
A23B 4/023     (2006.01)
A23B 4/09      (2006.01)
B82Y 40/00     (2011.01)

(52) U.S. Cl.
CPC .............. *A23B 4/20* (2013.01); *A23B 4/0235* (2013.01); *A23B 4/09* (2013.01); *A23L 17/40* (2016.08); *B82Y 40/00* (2013.01)

(58) Field of Classification Search
CPC ........... A23B 4/0235; A23B 4/24; A23B 4/20; A23B 4/09
See application file for complete search history.

(56) References Cited

FOREIGN PATENT DOCUMENTS

| | | | |
|---|---|---|---|
| CN | 100376175 | | 3/2008 |
| CN | 102450727 | | 5/2012 |
| CN | 102524910 | A * | 7/2012 |
| CN | 101991178 | | 5/2013 |
| CN | 104187791 | | 12/2014 |
| CN | 104413137 | | 3/2015 |
| CN | 104621234 | | 5/2015 |
| CN | 105010499 | | 11/2015 |
| CN | 105265568 | | 1/2016 |
| CN | 105432767 | | 3/2016 |
| CN | 105851198 | A * | 8/2016 |
| CN | 106689336 | | 5/2017 |
| CN | 106857786 | | 6/2017 |
| CN | 107467168 | | 12/2017 |
| CN | 107751359 | | 3/2018 |
| CN | 107960585 | | 4/2018 |
| CN | 108371207 | A * | 8/2018 |
| CN | 109247385 | | 1/2019 |
| EP | 3416503 | | 12/2018 |
| KR | 20150005304 | | 1/2015 |

OTHER PUBLICATIONS

"International Search Report (Form PCT/ISA/210)" of PCT/CN2019/123533, dated Jun. 24, 2020, with English translation thereof, pp. 1-6.
"Written Opinion of the International Searching Authority (Form PCT/ISA/237)" of PCT/CN2019/123533, dated Jun. 24, 2020, with English translation thereof, pp. 1-8.

* cited by examiner

*Primary Examiner* — Vera Stulii
(74) *Attorney, Agent, or Firm* — JCIP Global Inc.

(57) ABSTRACT

A preparation method for a water-retaining nanoagent and applications thereof in a quick-frozen crustacean shrimp product, related to the technical field of food processing. The formula of the present invention comprises inulin, xylitol, carboxymethyl chitosan, pullulan, sodium tripolyphosphate, sodium chloride, and sodium alginate. The powder raw materials are mixed evenly with water and then go through a homogenizer, a colloid mill, and an ultrasound treatment to produce the water-retaining nanoagent. The method of the present invention also relates to applications of the freeze-proof water-retaining agent in freezing a crustacean aquatic product.

18 Claims, No Drawings

PREPARATION METHOD FOR WATER-RETAINING NANOAGENT AND PROCESS OF TREATMENT CRUSTACEAN PRODUCT BY WATER-RETAINING NANOAGENT PREPARED BY THEREOF

CROSS-REFERENCE TO RELATED APPLICATION

This application is a 371 of international application of PCT application serial no. PCT/CN2019/123533, filed on Dec. 6, 2019, which claims the priority benefit of China application no. 201911075891.6, filed on Nov. 6, 2019. The entirety of each of the above mentioned patent applications is hereby incorporated by reference herein and made a part of this specification.

BACKGROUND

Technical Field

The present invention relates to preparation and applications of a water-retaining nanoagent for a crustacean aquatic product, and belongs to the technical field of food processing.

Description of Related Art

Crustacean aquatic products have the characteristics of high protein content and high water content, and spoil very easily under the effects of oxidizing reactions, microorganisms and endogenous enzymes, resulting in a decline in edible quality and a reduction of the economic value. The crustacean aquatic products are currently sold mainly in a fresh form and a frozen form. Although living-body selling can maintain the quality of the crustacean aquatic products to the greatest extent, due to the restrictions of conditions such as season and region, fresh selling is only limited to specific regions and seasons, and the products obtained in an off season or exported abroad are mostly sold in a frozen form. Frozen storage can maintain the nutritional value of the crustacean aquatic products to the greatest extent. However, ice crystals generated during the frozen storage easily damage the muscle cells and denature the proteins, and increase the juice loss in defrosting, resulting in the reduction of flavors and nutritional values of these products.

A water-retaining agent is one of the effective methods for reducing the degree of freeze denaturation of proteins in an aquatic product, and can effectively inhibit the growth of ice crystals in a frozen aquatic product, reduce the freeze denaturation of proteins, and reduce the influence of frozen storage on the muscle quality. Carbohydrates are widely applied in frozen aquatic products as a water-retaining agent; and the mechanism of action is that the carbohydrates can change the state of bound water embedded in protein molecules, and replace and bind to bound water on the surface of the protein molecules, thus achieving an effect of inhibiting protein denaturation. In addition, hydroxyl in the carbohydrate molecule reacts with certain groups in the protein molecule, so as to avoid aggregated denaturation among protein molecules. Xylitol is a polyhydroxyl sugar alcohol. Its molecule contains multiple hydroxyls, and these hydroxyls can be bound to water molecules in a form of hydrogen bonds. In a humid environment, xylitol will absorb some water to enhance the water holding capacity of the product and reduce the water activity of the product; and when humidity in the environment is reduced, xylitol will release some water to maintain the moisture retention of the product. Carboxymethyl chitosan, as a natural, nontoxic and efficient food preservative and film-forming agent, has a good development prospect in food processing, and its application in the meat industry has attracted wide attention for more than ten years. Relevant experiments home and abroad have found that xylitol can form a film layer on the surface of chilled meat, thereby effectively preventing water loss, reducing juice loss and improving the water retention of the meat. The addition of table salt facilitates the dissolution of proteins in muscle; and after these proteins (mainly myosins) are dissolved out, an adhesive layer is formed on the meat surface, which can prevent water loss. In addition, in a steaming process of an aquatic product, the salt and the proteins interact with each other and can form a strong three-dimensional reticular structure, which helps in binding water so as to achieve an effect of improving the tissue state of a meat product. Sodium alginate has good water solubility and excellent chelating capacity for metal ions such as $Ca^{2+}$ and $Mg^{2+}$ in water, and may be chelated with $Ca^{2+}$ and $Mg^{2+}$ in shrimp meat, so as to prevent water loss inside the muscle tissue.

Pullulan is a straight-chain polysaccharide formed by polymerizing, via an α-1,6 glycosidic bond, maltotriose repeating units connected by an α-1,4 glycosidic bond, with a molecular weight of 20,000-2,000,000 and a polymerization degree of 100-5,000. The polysaccharide has two important characteristics: an elastic structure and a high solubility. Pullulan has strong film-forming property, gas barrier property, plasticity and viscosity as well as good characteristics of high solubility in water, no toxin or harm, no color or smell and the like, and has been widely applied in the fields such as medicine, food, light industry, chemical industry and petroleum. On May 19, 2006, the Ministry of Health (China) issued announcement No. 8, in which pullulan is listed as one of the four new food additive products and can be used as a coating agent and a thickening agent in sugars, chocolate coatings, films, compound seasonings and fruit and vegetable juice beverages. Studies have shown that pullulan, as a novel coating preservative for marine products, can sufficiently and effectively inhibit massive accumulation of volatile basic nitrogen in the marine product, and also has a good protective effect against water evaporation in the marine product.

Inulin is a soluble dietary fiber and is a linear straight-chain polysaccharide formed by polymerizing fructoses via a β-(2-1) glycosidic bond, which has one glucose residue connected at the tail end of the molecule and a polymerization degree of 2-60 and is easily soluble in water. Inulin, as a supplement for food and nutrition, is used in various foods and has the effects of improving the texture, reducing the heat and the like, and can replace fat and carbohydrates to serve as a low-calorie filler, and also can be used as a water-retaining agent. In addition to this, inulin can serve as a protein protectant to reduce protein denaturation; and moreover, it acts to stabilize the protein conformation in the storage process, and also can function to reduce generation of ice crystals. For example, inulin can be used to protect cells and proteins as one of the major ingredients of an antifreeze agent for culture preservation. Different from most carbohydrate antifreeze agents such as sucrose and fructose, inulin is a non-digestible carbohydrate and thus causes little influence on blood glucose and is suitable for the diabetics; and in addition, inulin has better capacity than trehalose in stabilizing proteins in a freeze-drying process.

Xylitol and chitosan in a compound water-retaining agent are a kind of water swelling polymers, which have a huge polymer "framework" and carry a large number of polar hydrophilic groups such as —COOH, —OH and —$NH_2$ and can adsorb water that is hundreds of times greater than its mass or even more. For a water-retaining agent of the same mass, if the particle size is smaller, the specific surface area is larger, the water absorption rate is higher, and the time it takes to achieve water absorption saturation is shorter; and if the particle size is smaller, when water in a sample is in stress, the rate of releasing water into the sample is also higher.

Luo Xiaodong et al. disclose a "Practical Water-Retaining Agent for Food" (Chinese Patent Application No. CN201510516820.0), the formula of which includes 7-15 parts of phospholipid, 20-30 parts of sodium bicarbonate, 2-8 parts of sodium hexametaphosphate, 1-4 parts of trisodium monohydrogen diphosphate, 1-3 parts of calcium lactate and 20-30 parts of soybean oil. In contrast, the present invention adopts inulin and sugar alcohol to partially replace a phosphate, which not only can reduce the addition of a phosphate, but also can improve the frozen storage quality of an aquatic product.

Qi Fugang et al. disclose an "Aquatic Product Water Retention Agent"(Chinese Patent Application No. CN201710964216.3), in which the raw materials include 30-50 parts of protease, 10-15 parts of an antioxidant, 10-15 parts of tea polyphenol, 12-18 parts of lemon peel, 0-15 parts of sodium alginate, 0-6 parts of trehalose, 5-10 parts of Houttuynia cordata, 6-8 parts of xylooligosaccharide, 3-5 parts of amino acetic acid, 4-5 parts of chitosan, 2-4 parts of mannitol, 1-3 parts of a food acidity regulator, 0.5-3 parts of a softener, 1-3 parts of lactitol, 0-1 part of monascus red, 0.1-0.5 part of agar powder and 0.1-0.3 part of an alkaline phosphate. In contrast, the present invention adopts ultrasound to treat the water-retaining agent into nanoparticles, thereby increasing the specific surface area, promoting contact between a sample and the water-retaining agent and improving the water holding capacity of a product.

Yin Lihua et al. disclose a "Composite Water-Retaining Agent for Meat Products" (Chinese Patent Application No. CN201310390049.8), in which the raw materials include 30-50 parts of protease, 10-20 parts of a nonionic surfactant, 20-30 parts of an antioxidant, 5-10 parts of carrageenan and 10-20 parts of a composite phosphate. In contrast, the present invention is added with xylitol and chitosan, which can not only keep the meat of an aquatic product fresh and delicious, but also solve the problems such as physical harm to consumers caused by excess phosphate.

Li Jianrong et al. disclose a "Phosphorus-Free Water-Retaining Agent for Shrimp Meat and Use Method thereof" (Chinese Patent Application No. CN201010523259.6), the formula of which includes 0.5-3% of algin oligosaccharide, 1-10% of modified starch, 0.3-3% of calcium chloride, 0.5-10% of sorbitol, 0.5-5% of lactic acid and the balance of purified water. In contrast, the present invention combines sugar alcohol with nano treatment, which can also increase the nutrition and the water holding capacity of a product.

Zhang Xiaoli et al. studied the influences of different sugar alcohols on South American prawns, which indicates that xylitol, isomaltitol and mannitol can be used as an antifreeze water-retaining agent, and can provide a foundation for the production and use of a low-sugar and safe phosphorus-free water-retaining agent. In contrast, the present invention combines xylitol, chitosan and sodium alginate, and utilizes the polyhydroxyl water retention of xylitol as well as the good film-forming property of chitosan and sodium alginate, improving the processing safety and reducing the production cost.

Lin Youren et al. disclose a "Non-Phosphorus Water Retention Agent for Improving Tissue Taste and Succulence of Processed Meat Product" (Chinese Patent Application No. CN201410464374.9), in which the raw materials include 20-40 parts of sodium bicarbonate, 10-20 parts of potassium carbonate, 10-20 parts of sodium citrate, 10-20 parts of cyclodextrin, 8-15 parts of sodium alginate, 5-15 parts of carrageenan and 3-10 parts of xanthan gum. In contrast, the present invention adapts a combined treatment with a sugar alcohol system and table salt, which can significantly improve the texture of frozen peeled shrimps, and avoid the hardening, fragility and meat roughening and relieve the juice loss of the peeled shrimps in a cooking process.

Han Wenbin et al. disclose a "Water-Retaining Agent for Shrimps" (Chinese Patent Application No. CN201010511883.4), in which the raw materials include 30-50 parts of modified starch, 20-30 parts of an antioxidant, 5-10 parts of a food acidity regulator, 2-4 parts of mannitol, 1-2 parts of lactitol and 2-4 parts of aminoacetic acid. In contrast, the present patent adopts natural fresh-keeping and water-retaining raw materials, thereby guaranteeing the food safety and increasing the economic benefits of an aquatic product processing enterprise.

Zhang Min et al. disclose a "Method for Maintaining Tender Texture and Taste of Frozen Fresh-Water Shrimp, Crab, or other Aquatic Products with Shell" (Chinese Patent Application No. CN200610039317.1), which includes: washing a fresh living aquatic product, steaming and soaking same in a solution added with a water-retaining agent and an antioxidant, and implementing a combination of quick freezing, vacuum packing and low-temperature frozen storage techniques. In contrast, the present patent adopts the ultrasound technique to treat the raw materials of a water-retaining agent and process same into nanoscale, thus increasing the contact area with the product.

Zou Guoyong et al. disclose a "Micro-Freezing and Fresh-Keeping Process of Crustacean Aquatic Products" (Chinese Patent Application No. CN201810989188.5), which includes: pre-cooling the crustacean aquatic products with a fishing time of no more than 8 hours, disinfecting in a processing workshop, performing micro-freezing treatment for 15-30 min at −27.5° C. to −30.1° C. in a freezing point range of the crustacean aquatic products, and then storing in a cold storage at −28° C. to −30° C. In contrast, the present patent develops a novel water-retaining agent; after treatment with same, a product is quickly cooled to −10° C., and then can be stored in a cold storage; and therefore, the process is simple, and the cost is saved.

SUMMARY

Technical Problem

An objective of the present invention is to provide preparation and applications of a water-retaining nanoagent for crustacean shrimps, which mainly solves the existing problems of water loss of crustacean shrimps in a frozen storage process, resulting in decline in the texture and nutritional quality of aquatic products. This method helps to improve the water holding capacity of a product, increase the shelf life of the product, and promote the development of frozen crustacean aquatic products.

Technical Solution

A method for preparing a water-retaining nanoagent, wherein raw materials are formulated in the following parts by weight: 10-15 parts of inulin, 12-20 parts of xylitol, 5-10 parts of carboxymethyl chitosan, 5-10 parts of pullulan, 3-7 parts of sodium tripolyphosphate, 1-3 parts of sodium chloride, 1-3 parts of sodium alginate and 900-1,000 parts of water.

Further, the raw materials are formulated in the following parts by weight: 13 parts of inulin, 16 parts of xylitol, 6 parts of carboxymethyl chitosan, 5 parts of pullulan, 5 parts of sodium tripolyphosphate, 2 parts of sodium chloride, 1 part of sodium alginate and 952 parts of water.

The specific process includes: sufficiently and evenly mixing the raw materials, homogenizing with a homogenizer for 15-25 min, treating with a colloid mill for 4-6 min, then treating with an ultrasonic cell crusher at 400-600 W for 25-35 min, and centrifuging to obtain the water-retaining nanoagent.

Further, the specific process includes: sufficiently and evenly mixing the raw materials, homogenizing with a homogenizer for 20 min, treating with a colloid mill for 5 min, then treating with an ultrasonic cell crusher at 500 W for 30 min, and centrifuging to obtain the water-retaining nanoagent.

The particle size of the water-retaining nanoagent is 50-300 nm.

Application of the water-retaining nanoagent in a quick-frozen crustacean shrimp product, comprising the following steps.

(1) Quickly killing fresh crustacean shrimps, washing and draining for later use.

(2) Punching the treated crustacean shrimps, and soaking in the prepared water-retaining nanoagent at 2-6° C. for 2-4 h.

(3) Taking the soaked product out of the water-retaining agent, and wiping dry with gauze.

(4) Subpackaging the above-mentioned aquatic product, and keeping in frozen storage at −16° C. to −20° C.

The body length of the crustacean shrimps selected in the step (1) is 10-15 cm.

The volume ratio of the crustacean shrimps to the water-retaining nanoagent in the step (2) is (2-3):(8-9).

In the step (4), the crustacean shrimps treated in the step (3) are quickly frozen to make the central temperature of the product reach −10° C. within half an hour, and then are kept in frozen storage at −18° C.

The crustacean shrimps are crayfishes, sea shrimps, river shrimps and the like.

Advantageous Effects

The present invention adopts inulin, xylitol and pululan to partially replace a phosphate in a conventional water-retaining agent, so as to reduce the phosphate content, and also utilizes the polyhydroxyl water-retaining properties of inulin and xylitol as well as the fresh-keeping property of pulullan, so as to well maintain the water retention and nutritional quality of a frozen aquatic product. The present invention combines carboxymethyl chitosan and sodium alginate, and utilizes high solubility of carboxymethyl chitosan and good film-forming property of sodium alginate to block water volatilization, improving the processing safety and reducing the production cost. The present invention uses ultrasound to treat a compound water-retaining agent and makes same into nanoparticles. For a water-retaining agent of the same mass, if the particle size is smaller, the specific surface area is larger, the water absorption rate is higher, and the water retention of a product can be maintained better.

DESCRIPTION OF THE EMBODIMENTS

Example 1

Preparation of a water-retaining nanoagent and water-retaining application in a quick-frozen crayfish product. A carboxymethyl chitosan-xylitol water-retaining nanoagent consisted of the following raw materials in parts by weight: 10 parts of inulin, 16 parts of xylitol, 6 parts of carboxymethyl chitosan, 5 parts of pullulan, 5 parts of sodium tripolyphosphate, 2 parts of sodium chloride, 2 part of sodium alginate and 954 parts of water. The steps were as follows.

(1) Mixing of raw materials: the raw materials were weighed in the above proportions and then mixed evenly for later use.

(2) Ultrasound treatment: the raw materials mixed evenly in step (1) were added with an amount of water and stirred; then the raw materials were sufficiently and evenly mixed, homogenized with a homogenizer for 20 min and treated with a colloid mill for 5 min; a container was placed in an ultrasonic cell crusher; a probe with a 2 cm diameter was extended into the raw materials; and a sample was kept at room temperature in a low-temperature water bath, sealed and treated with 500 W ultrasound for 30 min in an ultrasound cycle with an operation time of 4 s and an interval time of 2 s.

(3) Application of the water-retaining agent: the water-retaining nanoagent after the ultrasound treatment in step (2) was applied in a frozen aquatic product.

A. Fresh crayfishes (with a body length of 10-15 cm) were quickly killed, washed and drained for later use.

B. The treated crayfishes were soaked in the prepared water-retaining nanoagent (the volume ratio of the crayfishes to the water-retaining nanoagent was 2:8) at 4° C. for 2 h.

C. The soaked product was taken out of the water-retaining agent, and wiped dry with gauze.

D. The above-mentioned aquatic product was subpackaged, and kept in frozen storage at −18° C.

Compared with a common water-retaining agent, the water-retaining nanoagent prepared by this method achieves good water retention of the peeled crayfishes in a frozen storage process, and keeps the water loss rate below 10% after 6 months of the frozen storage.

Example 2

Preparation of a water-retaining nanoagent and water-retaining application in a quick-frozen sea shrimp product. A sodium alginate-xylitol water-retaining nanoagent consisted of the following raw materials in parts by weight: 12 parts of inulin, 20 parts of xylitol, 5 parts of carboxymethyl chitosan, 5 parts of pullulan, 6 parts of sodium tripolyphosphate, 2 parts of sodium chloride, 2 part of sodium alginate and 948 parts of water. The steps were as follows.

(1) Mixing of raw materials: the raw materials were weighed in the above proportions and then mixed evenly for later use.

(2) Ultrasound treatment: the raw materials mixed evenly in step (1) were added with an amount of water and stirred; then the raw materials were sufficiently and evenly mixed, homogenized with a homogenizer for 20 min and treated with a colloid mill for 5 min; a container was placed in an ultrasonic cell crusher; a probe with a 2 cm diameter was extended into the raw materials; and a sample was kept at room temperature in a low-temperature water bath, sealed and treated with 500 W ultrasound for 30 min in an ultrasound cycle with an operation time of 4 s and an interval time of 2 s.

(3) Application of the water-retaining agent: the water-retaining nanoagent after the ultrasound treatment in step (2) was applied in a frozen aquatic product.

A. Fresh sea shrimps were quickly killed, washed and drained for later use.

B. The treated sea shrimps were soaked in the prepared water-retaining nanoagent (the volume ratio of the sea shrimps to the water-retaining nanoagent was 2:8) at 4° C. for 2 h.

C. The soaked product was taken out of the water-retaining agent, and wiped dry with gauze.

D. The above-mentioned aquatic product was subpackaged, and kept in frozen storage at −18° C.

Compared with a common water-retaining agent, the water-retaining nanoagent prepared by this method achieves good water retention of the peeled sea shrimps in a frozen storage process, and keeps the water loss rate below 10% after 6 months of the frozen storage.

Example 3

Preparation of a water-retaining nanoagent and water-retaining application in a quick-frozen river shrimp product. A carboxymethyl chitosan-xylitol water-retaining nanoagent consisted of the following raw materials in parts by weight: 13 parts of inulin, 16 parts of xylitol, 6 parts of carboxymethyl chitosan, 5 parts of pullulan, 5 parts of sodium tripolyphosphate, 2 parts of sodium chloride, 2 part of sodium alginate and 951 parts of water. The steps were as follows.

(1) Mixing of raw materials: the raw materials were weighed in the above-mentioned proportions and then mixed evenly for later use.

(2) Ultrasound treatment: the raw materials mixed evenly in step (1) were added with an amount of water and stirred; then the raw materials were sufficiently and evenly mixed, homogenized with a homogenizer for 20 min and treated with a colloid mill for 5 min; a container was placed in an ultrasonic cell crusher; a probe with a 2 cm diameter was extended into the raw materials; and a sample was kept at room temperature in a low-temperature water bath, sealed and treated with 500 W ultrasound for 30 min in an ultrasound cycle with an operation time of 4 s and an interval time of 2 s.

(3) Application of the water-retaining agent: the water-retaining nanoagent after the ultrasound treatment in step (2) was applied in a frozen aquatic product.

A. Fresh river shrimps (with a body length of 10-15 cm) were quickly killed, washed and drained for later use.

B. The treated river shrimps were soaked in the prepared water-retaining nanoagent (the volume ratio of the river shrimps to the water-retaining nanoagent was 2:8) at 4° C. for 2 h.

C. The soaked product was taken out of the water-retaining agent, and wiped dry with gauze.

D. The above-mentioned aquatic product was subpackaged, and kept in frozen storage at −18° C.

Compared with a common water-retaining agent, the water-retaining nanoagent prepared by this method achieves good water retention of the peeled river shrimps in a frozen storage process, and keeps the water loss rate below 10% after 6 months of the frozen storage.

What is claimed is:

1. A method for preparing a water-retaining nanoagent, comprising:

providing raw materials including 10-15 parts of inulin, 12-20 parts of xylitol, 5-10 parts of carboxymethyl chitosan, 5-10 parts of pullulan, 3-7 parts of sodium tripolyphosphate, 1-3 parts of sodium chloride, 1-3 parts of sodium alginate and 900-1,000 parts of water; and sufficiently and evenly mixing the raw materials, homogenizing the raw materials with a homogenizer for 15-25 min, treating the raw materials with a colloid mill for 4-6 min, then treating the raw materials with an ultrasonic cell crusher at 400-600 W for 25-35 min, to obtain the water-retaining nanoagent.

2. The method for preparing the water-retaining nanoagent according to claim 1, wherein the raw materials include 13 parts of inulin, 16 parts of xylitol, 6 parts of carboxymethyl chitosan, 5 parts of pullulan, 5 parts of sodium tripolyphosphate, 2 parts of sodium chloride, 1 part of sodium alginate and 952 parts of water.

3. The method for preparing the water-retaining nanoagent according to claim 1, wherein sufficiently and evenly mixing the raw materials, homogenizing the raw materials with a homogenizer for 20 min, treating the raw materials with a colloid mill for 5 min, then treating the raw materials with an ultrasonic cell crusher at 500 W for 30 min, to obtain the water-retaining nanoagent.

4. The method for preparing the water-retaining nanoagent according to claim 1, wherein a particle size of the water-retaining nanoagent is 50-300 nm.

5. The method for preparing the water-retaining nanoagent according to claim 3, wherein a particle size of the water-retaining nanoagent is 50-300 nm.

6. A process of treatment of a crustacean product by the water-retaining nanoagent prepared by the method of claim 1, comprising the following steps:

step (1) quickly killing fresh crustaceans, washing and draining for later use;

step (2) punching the treated crustaceans, and soaking in the prepared water-retaining nanoagent at 2-6° C. for 2-4 h;

step (3) taking the soaked product out of the water-retaining agent, and wiping dry with gauze; and step (4) subpackaging the prepared product in the step (3), and keeping in frozen storage at −16° C. to −20° C.

7. The process according to claim 6, wherein the volume ratio of the crustaceans to the water-retaining nanoagent in the step (2) is (2-3):(8-9).

8. The process according to claim 6, wherein in the step (4), the crustaceans are quickly frozen to make the central temperature of the product reach −10° C. within half an hour, and then are kept in frozen storage at −18° C.

9. The process according to claim 6, wherein in the step (1), the body length of the selected crustaceans is 10-15 cm; and the crustaceans are crayfishes, sea shrimps, river shrimps and the like.

10. The process according to claim 8, wherein in the step (1), the body length of the selected crustaceans is 10-15 cm; and the crustaceans are crayfishes, sea shrimps, river shrimps and the like.

11. The method for preparing the water-retaining nanoagent according to claim 2, wherein sufficiently and evenly mixing the raw materials, homogenizing the raw materials with a homogenizer for 20 min, treating the raw materials with a colloid mill for 5 min, then treating the raw materials with an ultrasonic cell crusher at 500 W for 30 min, to obtain the water-retaining nanoagent.

12. The method for preparing the water-retaining nanoagent according to claim 2, wherein a particle size of the water-retaining nanoagent is 50-300 nm.

13. A process of treatment of a crustacean product by the water-retaining nanoagent prepared by the method of claim 2, comprising the following steps:
- step (1) quickly killing fresh crustaceans, washing and draining for later use;
- step (2) punching the treated crustaceans, and soaking in the prepared water-retaining nanoagent at 2-6° C. for 2-4 h;
- step (3) taking the soaked product out of the water-retaining agent, and wiping dry with gauze; and
- step (4) subpackaging the prepared product in the step (3), and keeping in frozen storage at −16° C. to −20° C.

14. A process of treatment of a crustacean product by the water-retaining nanoagent prepared by the method of claim 3, comprising the following steps:
- step (1) quickly killing fresh crustaceans, washing and draining for later use;
- step (2) punching the treated crustaceans, and soaking in the prepared water-retaining nanoagent at 2-6° C. for 2-4 h;
- step (3) taking the soaked product out of the water-retaining agent, and wiping dry with gauze; and
- step (4) subpackaging the prepared product in the step (3), and keeping in frozen storage at −16° C. to −20° C.

15. A process of treatment of a crustacean product by the water-retaining nanoagent prepared by the method of claim 4, comprising the following steps:
- step (1) quickly killing fresh crustaceans, washing and draining for later use;
- step (2) punching the treated crustaceans, and soaking in the prepared water-retaining nanoagent at 2-6° C. for 2-4 h;
- step (3) taking the soaked product out of the water-retaining agent, and wiping dry with gauze; and
- step (4) subpackaging the prepared product in the step (3), and keeping in frozen storage at −16° C. to −20° C.

16. A process of treatment of a crustacean product by the water-retaining nanoagent prepared by the method of claim 5, comprising the following steps:
- step (1) quickly killing fresh crustaceans, washing and draining for later use;
- step (2) punching the treated crustaceans, and soaking in the prepared water-retaining nanoagent at 2-6° C. for 2-4 h;
- step (3) taking the soaked product out of the water-retaining agent, and wiping dry with gauze; and
- step (4) subpackaging the prepared product in the step (3), and keeping in frozen storage at −16° C. to −20° C.

17. The process according to claim 7, wherein in the step (4), the crustaceans are quickly frozen to make the central temperature of the product reach −10° C. within half an hour, and then are kept in frozen storage at −18° C.

18. The process according to claim 7, wherein in the step (1), the body length of the selected crustaceans is 10-15 cm; and the crustaceans are crayfishes, sea shrimps, river shrimps and the like.

* * * * *